US010662795B2

(12) United States Patent
Leduc et al.

(10) Patent No.: US 10,662,795 B2
(45) Date of Patent: May 26, 2020

(54) ROTARY ASSEMBLY FOR A TURBOMACHINE

(71) Applicant: Snecma, Paris (FR)

(72) Inventors: Mathieu Louis Jean Leduc, Moissy-Cramayel (FR); Pierre-Louis Alexandre Carlos, Moissy-Cramayel (FR); Clement Roussille, Bordeaux (FR)

(73) Assignee: Snecma, Paris (FR)

( * ) Notice: Subject to any disclaimer, the term of this patent is extended or adjusted under 35 U.S.C. 154(b) by 364 days.

(21) Appl. No.: 15/024,752

(22) PCT Filed: Sep. 23, 2014

(86) PCT No.: PCT/FR2014/052375
§ 371 (c)(1),
(2) Date: Mar. 24, 2016

(87) PCT Pub. No.: WO2015/044578
PCT Pub. Date: Apr. 2, 2015

(65) Prior Publication Data
US 2016/0237840 A1 Aug. 18, 2016

(30) Foreign Application Priority Data
Sep. 25, 2013 (FR) ...................................... 13 59239

(51) Int. Cl.
*F01D 11/00* (2006.01)
*F01D 5/30* (2006.01)
*F01D 5/12* (2006.01)

(52) U.S. Cl.
CPC .............. *F01D 11/006* (2013.01); *F01D 5/12* (2013.01); *F01D 5/3015* (2013.01);
(Continued)

(58) Field of Classification Search
None
See application file for complete search history.

(56) References Cited

U.S. PATENT DOCUMENTS 3,734,646 A * 5/1973 Perkins ................... F01D 5/326
416/220 R
3,853,425 A * 12/1974 Scalzo ...................... F01D 5/18
416/193 A
(Continued)

FOREIGN PATENT DOCUMENTS

EP 1 443 179 A2 8/2004
FR 2 982 635 A1 5/2013
(Continued)

OTHER PUBLICATIONS

PCT/FR2014/052375 Written Opinion of the International Search Authority, document "FR2014_052375 PCT_ISA_237 translation".*

Primary Examiner — John Fox
(74) Attorney, Agent, or Firm — Blank Rome LLP

(57) ABSTRACT

The invention concerns a rotary assembly for a turbomachine, comprising a disk of which the outer periphery is formed from an alternation of cavities and teeth (12), and blades extending radially from the disk and of which the roots (16) are engaged axially and held radially in the cavities of the disk. According to the invention, the teeth of the disk and the blade roots comprise, at the upstream and/or downstream axial ends of same, axial shoulders (74, 76) disposed circumferentially end-to-end in alternation and together forming a cylindrical surface (78) facing radially towards the inside of the disk.

15 Claims, 2 Drawing Sheets

(52) U.S. Cl.
CPC ........ *F01D 11/001* (2013.01); *F05D 2220/32* (2013.01); *F05D 2240/30* (2013.01); *F05D 2240/81* (2013.01); *F05D 2300/6033* (2013.01); *Y02T 50/672* (2013.01)

(56) References Cited

U.S. PATENT DOCUMENTS

| | | | |
|---|---|---|---|
| 4,218,189 A * | 8/1980 | Pask | F01D 5/225 |
| | | | 277/420 |
| 4,523,890 A * | 6/1985 | Thompson | F01D 11/006 |
| | | | 416/193 A |
| 5,318,405 A | 6/1994 | Meade et al. | |
| 6,234,756 B1 | 5/2001 | Ress, Jr. et al. | |
| 6,464,453 B2 | 10/2002 | Toborg et al. | |
| 7,556,474 B2 | 7/2009 | Marchi | |
| 9,004,874 B2 | 4/2015 | Jamison | |
| 10,060,276 B2 * | 8/2018 | Tanaka | F01D 11/003 |
| 2011/0243746 A1 * | 10/2011 | Liotta | F01D 5/282 |
| | | | 416/214 R |

FOREIGN PATENT DOCUMENTS

| | | |
|---|---|---|
| GB | 2 148 404 A | 5/1985 |
| JP | 2002-201915 A | 7/2002 |
| JP | 2013-170577 A | 9/2013 |
| RU | 2373402 C2 | 11/2009 |

* cited by examiner

ROTARY ASSEMBLY FOR A TURBOMACHINE

The invention relates to a rotary assembly for a turbomachine, such as in particular an aircraft jet engine, and a turbomachine including such an assembly.

Such an assembly, which can be found in particular in a turbine, comprises a disk and blades extending radially from the disk and the roots of which are engaged axially into and held radially in the cavities of the outer periphery of the disk, arranged in alternation with teeth The blades also comprise inner platforms circumferentially arranged end to end so as to define, together, the inner limit of the hot gas flow circulating in the turbine. The portion of the blade between the inner platform and the root is called a stilt. According to this provision, spaces are formed between two adjacent stilts, and form inter-stilt or inter-blade cavities. The platforms may extend, at their upstream and downstream ends, into walls extending radially toward the inside so as to axially and partly close the inter-blade cavities. So-called hole-bottom cavities are also formed in the radial spaces formed between the blade roots and the bottoms of the holes.

To ensure the correct operation of the turbomachine, cooling air is taken from a low-pressure or high-pressure compressor for example and routed from upstream or downstream of the disk to the hole-bottom cavities so as to ensure the cooling of the disk and to protect the latter from heating caused by the hot gas from the stream flow circulating between two adjacent platforms.

In addition, when the rotary assembly described above is arranged upstream of the turbine rotor, an annular space is formed between the disk and an upstream stator element. This annular space thus provides a direct communication between the hot gas stream and internal elements of the turbomachine. In this case, the cooling air supplied from upstream of the disk is also used to prevent the reintroduction of the stream gas into the upstream annular space of the disk.

Where no special sealing technology is applied upstream of the inter-blade cavities and covering for example the radial walls of the platforms, cooling air may leak at the junction zones between the blades and circulate in the inter-blade cavities. Thus, such cooling air does not participate in cooling the disk through the hole-bottom cavities, and does not contribute to prevent the reintroduction of the stream gas towards the internal components of the turbomachine if appropriate. Such air leaks require more air sampling at the low-pressure compressor, which reduces the output of the turbomachine.

To minimize such air leaks, one solution consists, as in GB 2148404, in sealing the inter-blade cavities using an annular ring axially mounted against the blade roots and the teeth of the disk, so as to cover the area positioned radially between the hole-bottom cavities and the inter-blade cavities and held tightly on the disk by a flange. An annular passage is defined between the flange and the disk radially inside the ring, for guiding the cooling air from the inside of the disk towards the hole-bottom cavities. This ring thus provides insulation between said annular cooling air passage and the inter-blade cavities located outside the ring.

However, it has been noted that in operation, the blade has a degree of axial freedom in the cavity which is possible, on the one hand, because the axial dimensions of the blade roots must be nominally smaller than the axial dimensions of the disk so as to make sure that the ends of the blade roots never go further than the axial ends of the cavities, to avoid applying axial tightening stresses on the blade roots caused, for example, by the flange applied to the upstream face of the disk. Besides, this degree of freedom is made possible by the differential expansion between the disk and the blades, particularly when the latter are made of ceramic matrix composite (CMC) and the disks are made of a metal alloy.

In operation, this degree of freedom thus induces the formation of gaps between the annular sealing ring axially tightened against the teeth of the disk, and the axial ends of the blade roots. Part of the cooling air supplied into the hole-bottom cavities thus flows through these gaps to the inter-blade cavities and no longer fulfills its primary function of cooling the cavities in the disk.

In the document GB 2148404, a succession of trays (one of which bears reference 84, in FIG. 2 of this document) in ring sectors extend in front of the blade roots and teeth and press the annular ring or seal ring into a space defined by an axial shoulder. Because of the centrifugal effect, when the turbomachine operates, the annular seal is closely pressed against the shoulder, thus providing the desired seal. In operation, important stresses apply to the seal (which has an S-shaped or a substantially vertically reversed omega section) and the document describes in page 3 that sealing depends on how it deforms. Thus, fatigue of the seal may make sealing more uncertain. Besides, when the centrifugal effect is less important or cancelled (with the machine stopped), the seal is movable in its space. Damage or an incorrect positioning may occur.

The present invention aims at preventing such a situation and at securing sealing, by providing a simple, efficient and economical solution to these problems.

For this purpose, it provides for a rotary assembly for a turbomachine, comprising a disk, the outer periphery of which is formed from an alternation of cavities and teeth and blades extending radially from the disk and the roots of which are engaged axially into, and held radially in the cavities of the disk, with the teeth of the disk and the blade roots comprising, at the upstream and/or downstream axial ends of same, axial shoulders disposed circumferentially end-to-end in alternation and together forming a cylindrical surface facing radially towards the inside of the disk and on which an annular seal is held using a part made integral with the disk, characterized in that said part extends under the shoulders and radially presses the annular seal against said cylindrical surface.

Thus, when the seal tightening annular part ensures the supply of air as described above, cooling air can no longer flow toward an inter-blade cavity due because of the continuous contact of the seal with the cylindrical surface formed by the shoulders.

Preferably, the seal holding part which is made integral with the disk includes an annular groove in which the annular seal is mounted. Thus, the joint will be correctly held and exposed to less stress, which is favorable to a long service life and efficiency.

According to another characteristic of the invention, the shoulders of the blade roots are formed by the surfaces of radially inner end faces of upstream and/or downstream radial walls extending transversely to the blade root and externally connected to platforms of the blades and internally connected to the blade roots (at some radial distance from the free end of which said shoulders are located). Thus, the annular seal is tightened onto a cylindrical surface and no longer onto radial surfaces of the free ends of the blade roots. The annular seal constantly remains in contact with the cylindrical surface whatever the relative axial movement between the blade roots and the cavities of the disk during operation, which enables a more effective tightening without discontinuity of the entire outer surface of the seal on the cylindrical surface formed by the axial shoulders of the teeth and the blade roots (the width of the root shoulders may be adapted if need be, whatever the width—or axial dimension—of the roots proper).

The transverse walls have the additional advantage of sealing the inter-blade cavities against the stream flow.

Said part made integral with the disk may be an annular flange applied onto an upstream and/or downstream face of the disk and comprising jaw clutching means cooperating with matching jaw clutching means of the disk for axially holding the flange on the disk.

The flange is preferably formed of several sectors arranged circumferentially end-to-end and each flange section comprises an inner portion radially supported toward the outside by the annular seal and an outer portion comprising said jaw clutching means cooperating with said matching jaw clutching means formed on the teeth of the disk, with said matching jaw clutching means of the disk axially protruding with respect to the blade roots.

The outer portion of each flange section advantageously comprises a radial wall extending externally in a flared rim, the outer free end of which is intended to rest on one of the upstream or downstream transverse walls of the blades.

To obtain a maximum effect, the inner portion of each flange section comprises a cylindrical wall, one end portion of which facing the disk is radially supported toward the outside on the annular seal and is extended by a frustoconical wall extending inwardly away from the disk, with a split annular ring being axially inserted between the frustoconical wall and the disk.

Such mounting, with a single radial bearing of the cylindrical wall at the seal makes it possible, thanks to the recovery of the centrifugal forces of the part, to crush the seal between the cylindrical wall of the flange and the cylindrical surface formed by the shoulder for an optimal sealing. When cold, the part is mounted by jaw clutching, once the blades are accommodated in their cavities. In operation, the centrifugal force causes an increase in the diameter of the ring which rests on the frustoconical wall and causes an axial tilting of the flange sectors around the jaw clutching line, causing the free end of the flared flange to come into contact with the transverse radial walls of the blades, thus avoiding the reintroduction of stream air between the flared edges and transverse radial walls and ensures better thermal protection of the teeth.

According to another embodiment of the invention, said part made integral with the disk is a sealing lip supporting ring intended to cooperate with a radially opposite block made of abradable material.

Advantageously, the blade is made of ceramic matrix composite and the disk is made of a metal alloy thus enabling a significant reduction of the mass (the density ratio between metal alloy and CMC ranging from 3 to 4) of the rotor enabling a reduced energy consumption of the turbomachine.

The invention also relates to a turbomachine turbine, characterized in that it comprises a rotary assembly according to one of the preceding claims.

The invention eventually relates to a turbomachine, such as a turboprop engine or a turbojet engine, characterized in that it comprises a rotary assembly according to one of the preceding claims.

Other details, characteristics and advantages of the invention will appear upon reading the following description given by way of a non restrictive example while referring to the appended drawings wherein.

Figure 1:
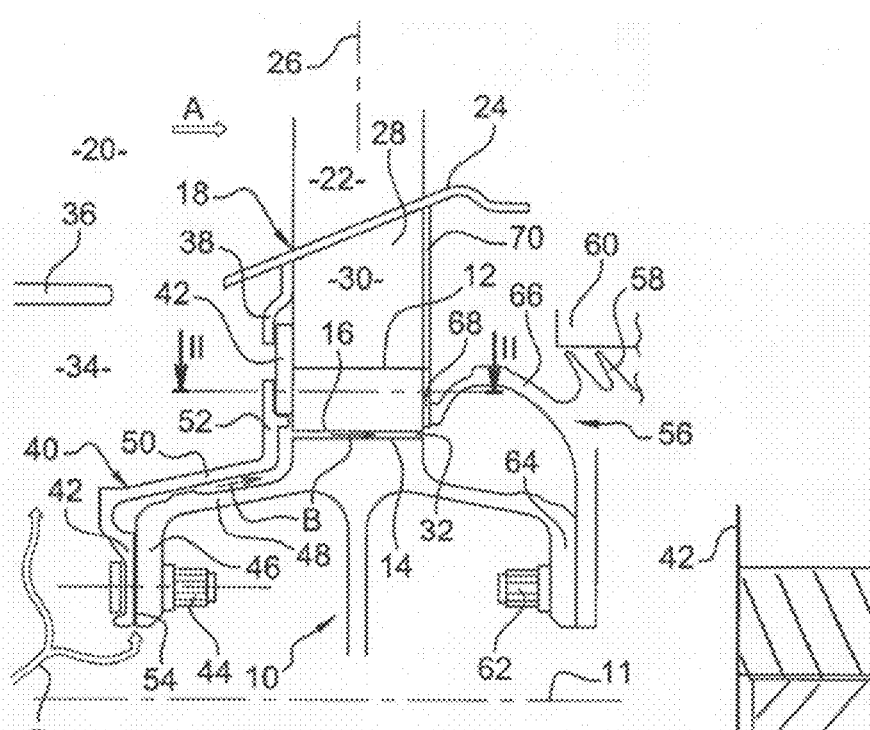
FIG. 1 is a schematic view, in axial cross-section, of a turbine rotary assembly of the prior art.
Figure 2:
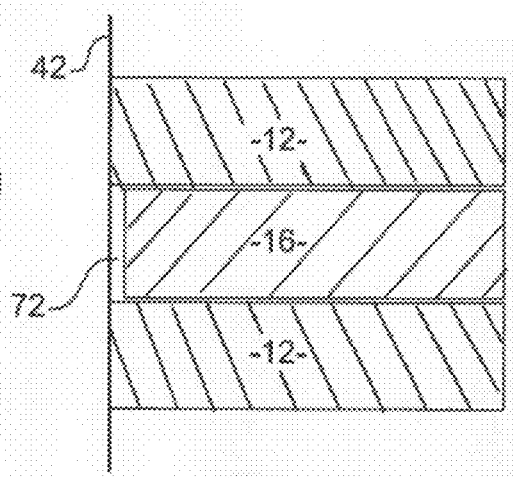
FIG. 2 is a schematic view along the line II-II in FIG. 1.

According to the known technique shown in FIGS. 1 and 2, a turbine rotary assembly consists of a rotary disk 10 centered on the axis 11 of the turbine, and comprising at its outer periphery, teeth (the apex of which is referenced 12) arranged alternately with cavities (the base of which is referenced 14) wherein blade roots (the inner end of which is referenced 16), are axially engaged into and radially retained in, with such blades 18 extending radially from the cavities 14 into an air flow 20 annular stream (arrow A) from a combustion chamber (not shown).

More specifically, each blade 18 includes radially from the outside to the inside a blade 22, a platform 24 substantially perpendicular to the axis of elongation 26 of the blade 18 and defining the inner annular boundary of the hot gases flow stream 20, with a stilt 28 connecting the platform 24 to the blade root 16 having the shape for example of a dovetail or similar to ensure the radial holding of the blade roots 16 in the cavities 14. According to this provision, spaces are formed between two circumferentially adjacent stilts, and are referred to as inter-stilt or inter-blade cavities 30. So-called hole-bottom cavities 32 are also formed in the radial spaces formed between the blade roots 16 and the bottoms of the holes 14.

A cooling air flow B is conveyed from a low pressure compressor arranged upstream, for example, to the inside of the turbine, and is used on the one hand to cool the hole bottom cavity 32 and therefore the disk 10, and on the other hand, to prevent the reintroduction of the stream A gases into the annular space 34 formed between the disk 10 and an upstream stator element 36, with such annular space forming a direct communication between the stream 20 of hot gases and internal elements of the turbomachine.

To limit the sampling of cooling air from the compressor, which is detrimental to the performance of the turbomachine, sealing means are formed upstream and downstream of the disk 10 to define two sealed annular circuits for the circulation of cooling air B through the hole bottoms cavities 32 and into the annular space 34 upstream from the disk 10. In particular, the aim of such sealing means is to prevent the cooling air B from circulating in the inter-blade cavities 30 through the circumferential spaces between the stilts 28, and not to participate in cooling the disk 10 through the hole bottom cavities 32, nor in preventing the reintroduction of stream gas A into the annular space 34 upstream of the disk.

The sealing means comprise walls 38 extending radially inwardly from upstream the platforms 24 of the blades 18 in order to axially and partly seal the inter-blade cavities 30, an annular flange 40 and an annular ring 42.

The annular flange 40 includes a radially inner wall 43 for the fastening by bolts 44 on a radial annular flange 46 made integral with the disk 10 via a connecting wall 48. It also comprises a frustoconical wall 50 connecting the radially inner wall 42 to an outer radial annular wall 52 axially bearing in the downstream direction, on the annular ring 42. Apertures 54 for the passage of air are provided at the junction between the radially inner wall 43 of the flange 40 and the annular flange 46 of the disk to enable the circulation of air B between the frustoconical wall 50 of the flange and the connecting wall 48 of the disk 10 to the hole bottoms of cavities 32.

The annular ring 42 is thus radially pressed upstream of the blade roots 16 and of the disk 10 between the platforms 24 and the hole bottoms cavities 32 by means of the radial walls 38 extending from upstream the platforms 24 and the radial wall 52 of the flange 40. This assembly is used to axially seal inter-blade cavities 30 upstream.

The downstream sealing means comprise a lip 58 supporting ring 56 cooperating with a block 60 made of abradable material which is carried by a manifold (not shown), with the ring 56 being bolted 62 between a downstream annular flange 64 of the disk 10 and an upstream annular flange of a downstream disk (not shown). The ring includes a curved downstream annular arm 66, resiliently and axially resting on an annular ring 68 applied against the downstream faces of the teeth 12 of the disk and the blade roots 16. The ring 68 is radially arranged just above the hole bottoms cavities 32, so that the cooling air B flows in the downstream direction, radially inside the arm 66 of the ring 56. Radial walls 70 also extend radially inwardly from the platforms downstream to the outer periphery of the annular ring 68, to axially seal the inter-blade cavities 30 downstream.

According to this arrangement, it has been noted that, in operation, a portion of the cooling air B flows from the hole bottoms of cavities 32 to the inter-blade cavities 30. As a matter of fact, in operation, while the annular rings 42, 68 are pressed against the radial end surfaces of the teeth 12 of the disk, axial gaps 72 are formed between the annular rings 42, 68 and the axial ends of the blade roots 16. This firstly results from the fact that the axial dimension of the blade root 16 is nominally smaller than the axial dimension of the disk 10 to ensure that the ends of the blade roots never exceed the cavities 14 to prevent the flange 40 and the lip supporting ring 56 tightening axial stresses from applying to the blade roots 16, and on the other hand, from the fact that the blade roots 16 expand relatively less than the teeth of the disk. In particular, for blades 18 in ceramics matrix composite (CMC) and a disk 10 made of a, for example nickel-based high temperature resistant metal alloy, capable of being forged, a two to three ratio exists between the differential expansion of these parts. In this regard, FIG. 2 shows how an axial gap 72 can be formed between an annular ring 42 and the axial end of a blade root 16, allowing cooling air to flow from the hole bottom cavity to the inter-blade cavity radially towards the outside of the gap.

Figure 3:
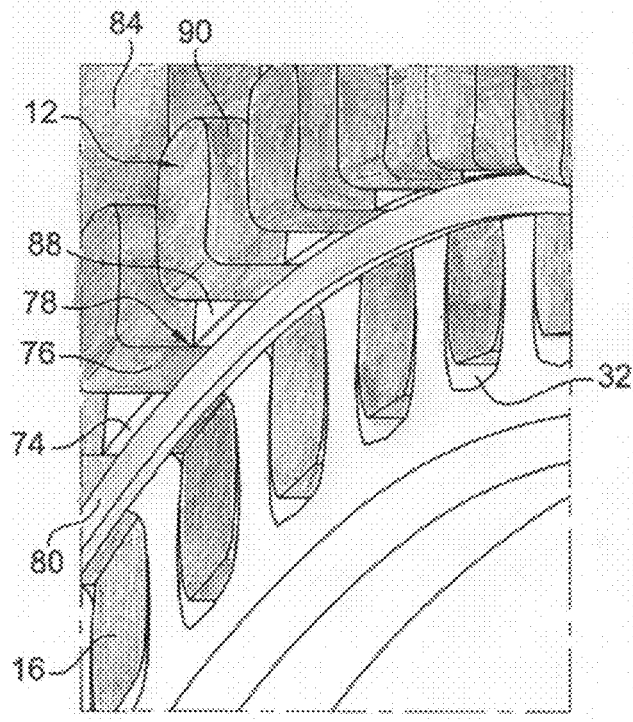
FIG. 3 is a perspective view of a rotary assembly according to the invention, seen in the downstream direction, according to the selected embodiment.
Figure 4:
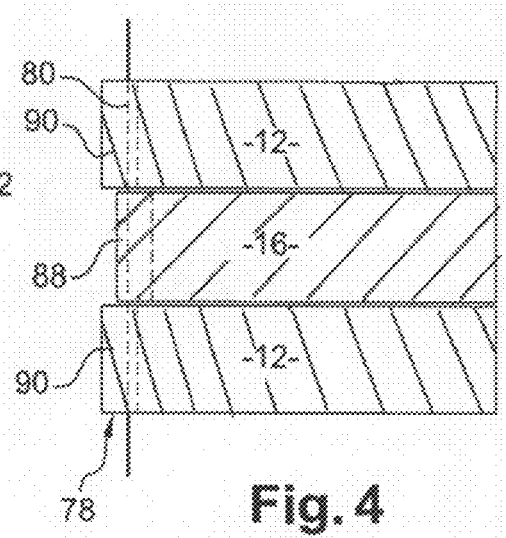
FIG. 4 is a schematic view of the same type as FIG. 2 according to the invention.

As shown in FIGS. 3 and 4, the invention advantageously makes it possible to form sealing means between the hole bottoms cavities 32 and the inter-blade cavities 30, not subject to the relative axial offsets between the ends of the blade roots 16 and the ends of the teeth 12 of the disk 10 due to differential expansion between the parts and manufacturing tolerances.

According to the invention, shoulders 74, 76 are arranged circumferentially end to end, alternately at the upstream and downstream ends of the blade roots 16 and teeth 12 of the disk so as to form an upstream cylindrical surface 78 and a downstream cylindrical surface 78 inwardly oriented and whereon annular seals 80 are applied. These upstream and downstream cylindrical surfaces can be considered as continuous because of the abutting arrangement of the shoulders of the blades and the disk. Such shoulders are radially formed at the same level as the interfaces between the side flanks of the teeth 12 of the disk and the side flanks of the blade roots 16, when the blade roots are pressed toward the outside against the teeth, because of the centrifuge effect. As seen in FIG. 3, when the roots 16 are in the cavities 14, and thus radially extend to the hole bottoms of the cavities 32, the free end 160 of each root is located radially deeper inside than its shoulder 74. And each cavity bottom 32 is closed and does not communicate with the one accommodating the adjacent blade root, unlike what is disclosed in GB 2 148 404 wherein, as the free end 68 of each blade root forms the shoulder for the seal 70, the receiving space 56 is circumferential and common to all roots. The solution presented here which uses individualized teeth and cavities is preferred.

For this purpose, each blade includes an upstream transverse radial wall 84 and a downstream transverse radial wall 84 extending radially between the platform 24 and the blade root 16. When the blades are made of CMC, these transverse radial walls 84 can be made of CMC by weaving or sintering and assembled by brazing, codensification, siliconizing. When the blades are made of metal, they may be formed integrally by molding with the upstream and downstream ends of the stilt 28. These upstream and downstream transverse walls 84 may also be externally attached in a similar manner on the platform 24 of the blade. These walls 84 have at their inner ends a radial finger 88 partly extending over the height of the blade root 16, between axially protruding portions at the outer ends of the teeth 12 of the disk. The inner end faces 74 of the fingers 88 and the inner faces 76 of the protruding parts 90 of the teeth 12 of the disk form circumferentially aligned cylindrical surface portions 78, radially facing the inside thereof, located radially outside the hole bottoms of cavities 32 and having an axial thickness sufficient to form the shoulders 74, 76 whereon an annular seal 80 may be applied.

These surface portions 74, 76 are circumferentially aligned end to end, which makes it possible to obtain a tight surface 78 which can be used for fitting a seal. The dimensions of the cylindrical surface portions are axially large enough for a cylindrical surface 78 to remain, in operation, where the seal 80 remains in contact so as to provide a permanent seal, in spite of the relative differences described above between the axial ends of the teeth 12 of the disk and the blade roots 16. The transverse radial walls 84 may be made, in the case of a CMC blade by soldering a wafer on the axial end face of the blade.

Figure 5:
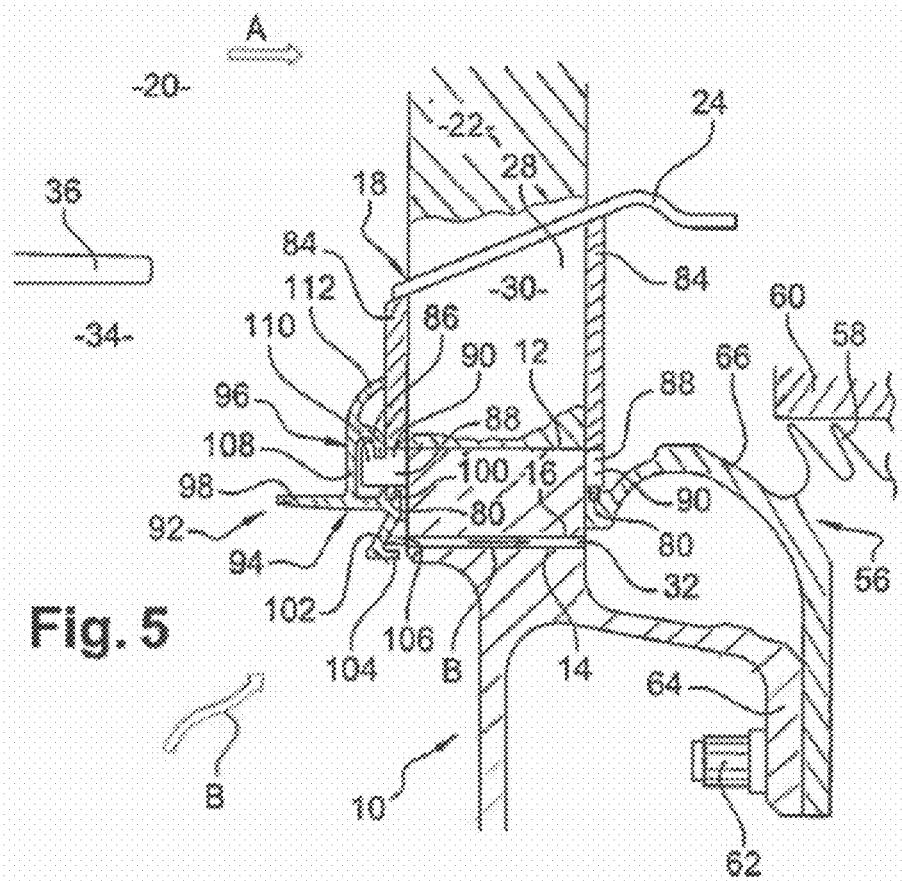
FIG. 5 is a schematic view in axial section of a turbine rotary assembly according to a first embodiment of the invention.
Figure 6:
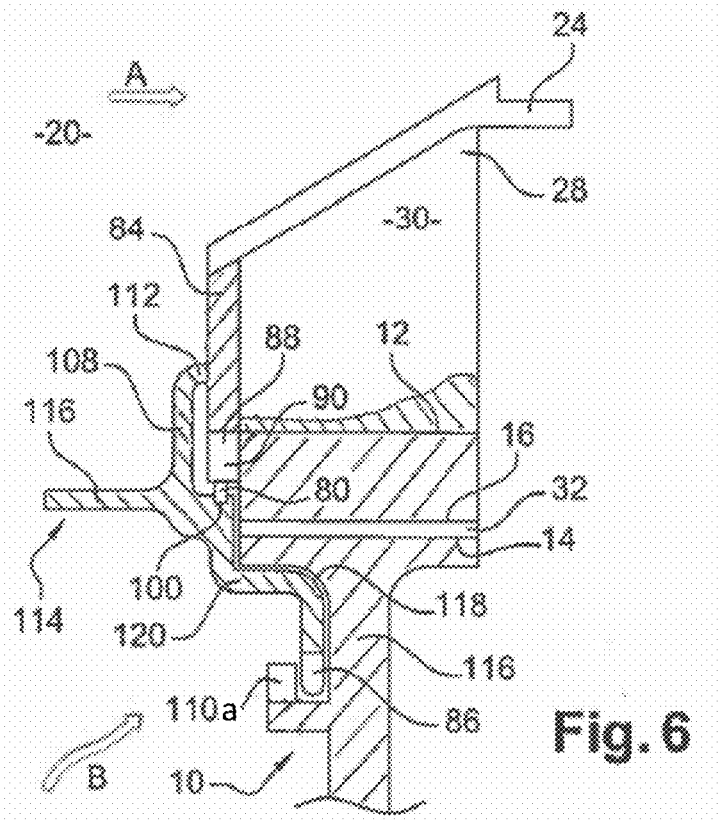
FIG. 6 is a schematic view in axial section of a turbine rotary assembly according to a second embodiment of the invention.

The invention described above is implemented in two embodiments, the first one being shown in FIG. 5 and the second one in FIG. 6. In both embodiments, annular parts are brought against one of the faces of the disk 10 and of the blades 18 so as to hold the seal 80 tight against the cylindrical surface 78 of the shoulders 74, 76, and to form the cooling air circuit passing through the hole bottoms of the cavities 32. Thus, no leakage exists any longer from the cooling air circuit to the inter-blade cavities 30.

In the first embodiment shown in FIG. 5, the annular part added upstream is a sectorized flange 92 comprising an inner portion 94 and an outer portion 96. The inner portion 94 comprises a cylindrical wall 98 the portion extending opposite the disk of which forms a spoiler and the portion near the disk extending under the shoulders 74, 76 of which includes an annular groove 100 wherein the annular seal 80 is mounted and pressed against the cylindrical surface 78 of the shoulders. The portion near the cylindrical wall is connected to a frustoconical wall 102 extending inwardly, away from the disk and connected at its inner end to a cylindrical rim 104 extending toward the disk 10. An annular slit ring 106 with a wedge- or triangular-shaped section is mounted between said frustoconical wall 102 of the flange and the radial faces of the teeth 12 and blade roots 16 axially opposite the frustoconical wall.

The cylindrical wall 98 of the flange 92 is also connected to an outer part 96 comprising a radial wall 108 extending radially outward upstream of jaw clutching members 110 formed at the upstream ends of the protruding portions 90 of the teeth 12 of the disk. Such jaw clutching members 110 of the disk teeth protrude in the upstream direction with respect to the upstream transverse radial walls 84 of the blades and comprise L-shaped hooks and circumferentially alternating hollow portions. The outer end of the radial wall 108 of the flange 92 comprises L-shaped hooks 86 and hollow portions. The L-shaped hooks of the flange 92 cooperate with the hooks of the teeth 12 of the disk to ensure the axial holding of the flange 92 on the disk 10. The radial wall 108 is further connected externally to a flared rim 112 downstream, intended to bear against the transverse radial walls 84 of the blades.

Such mounting makes it possible, thanks to the recovery of the centrifugal forces of the part, to radially crush the seal 80 between the cylindrical wall 98 of the flange and the cylindrical surface 78 formed by the shoulders 74, 76, to obtain an optimum sealing. When cold, the part is mounted by jaw clutching, once the blades 18 are accommodated in their cavities 14. The split ring 106 opens circumferentially in operation by centrifugal effect, and slips between the tapered wall 102 and the disk 10 so as to induce tilting of the flange 92 sectors about an axis situated in the jaw clutching area and substantially perpendicular to the axis 11 of the turbine in order to ensure a contact of the free end of the flared rim 112 on the transverse radial walls 84 and thus to protect the protruding portions 90 of the disk teeth against the stream air A.

In operation, the cooling air flows between the tapered wall 102 and the disk 10, and accesses the hole-bottoms of the cavities 32 then being situated under the slit ring 106.

Downstream of the disk, and in the case where the cooling circuit is not limited only to the hole-bottom but also to the cooling of a ring 56 supporting sealing lips, the crushing of the seal 80 is ensured by the external surface of the upstream end of the arm 66 of the ring 56, under the effect of centrifugal forces during operation.

The sealing means according to the invention upstream of the disk can therefore be used in combination with the sealing means downstream of the disk, or independently from each other. As a matter of fact, an optimum sealing does not require to form shoulders upstream and downstream of the disk.

In the second embodiment shown in FIG. 6, the annular part inserted upstream is an annular flange 114 made in one piece. In this embodiment, the hub 116 of the disk 10 has an axial widening 118 just before its outer end. The jaw clutching means, referenced 110a in this second embodiment, are in this embodiment circumferentially formed on the upstream face of the hub 116, inside the widening 118 thereof.

Unlike the first embodiment, as the cylindrical wall 116 of the flange 114, extends under the shoulders 74, 76 of the teeth of the disk and the blade roots, and radially bears against the annular seal 80, it is not connected at its end to a frustoconical wall, but to an annular wall 120 radially extending toward the inside of the disk 10 to the jaw clutching means 110a of the hub and having a shape matching that of the disk 10. This wall defines with the portion of the disk opposite an annular cooling air flow passage B between the wall 120 and the disk. This wall also has, at its inner end, jaw clutching means 86 cooperating with the jaw clutching means 110a of the disk, for an axial blocking of the flange 114.

When cold, the flange 114 is mounted prestressed against the annular seal 80 radially bearing on the cylindrical surface 78 of the shoulders.

This second embodiment of an upstream flange 114 has the advantage of achieving better sealing in the upstream portion of the disk due to its design in one piece, as compared with the first embodiment. In addition, it reduces the axial stresses applied to the teeth 12 of the disk 10 due to the positioning of the jaw clutching means at the hub 116. However, the flange 92 of the first embodiment has a better mechanical strength, because it is sectored, and enables a more reliable axial contact between the flared rim 121 and the transverse radial walls 84.

The invention claimed is:

1. A rotary assembly for a turbomachine, the rotary assembly comprising:
   a disk, the outer periphery of which is formed from an alternation of cavities and teeth, and
   blades extending radially from the disk and having roots, the teeth of the disk and the roots of the blades comprising, at an upstream axial end, a downstream axial end, or a combination thereof, axial shoulders disposed circumferentially end-to-end in alternation and together forming a cylindrical surface facing radially towards the inside of the disk and on which an annular seal is held by means of a part affixed to the disk, wherein said part extends under the shoulders and radially presses the annular seal against said cylindrical surface, wherein the part comprises an annular flange applied onto an upstream face of the disk, a downstream face of the disk, or a combination thereof, wherein the annular flange comprises a jaw clutching means cooperating with matching jaw clutching means of the disk for axially holding the annular flange on the disk, and wherein an outer portion of the annular seal comprises said jaw clutching means cooperating with said matching jaw clutching means formed on the teeth of the disk, said matching jaw clutching means of the disk axially protruding with respect to the roots of the blade.

2. The rotary assembly according to claim 1, wherein said part comprises an annular groove wherein the annular seal is mounted.

3. The rotary assembly according to claim 2, wherein the shoulders of the roots of the blades are formed by radially inner end faces of upstream and/or downstream radial walls which extend transversely to the root of the blade and are externally connected to platforms of the blades and internally to the roots of the blades.

4. The rotary assembly according to claim 3, wherein said part affixed to the disk is a ring for supporting sealing lips intended to cooperate with a radially opposite block made of an abradable material.

5. The rotary assembly according to claim 1, wherein the flange is formed of several sectors arranged circumferentially end-to-end.

6. The rotary assembly according to claim 5, wherein the outer portion of each flange section comprises a radial wall extending externally in a flared rim, the outer free end of which is intended to rest on one of the upstream or downstream transverse walls of the blades.

7. The rotary assembly according to claim 6, wherein the inner portion of each flange section comprises a cylindrical wall, one end portion of which facing the disk is radially supported toward the outside on the annular seal and is extended by a frustoconical wall extending inwardly away from the disk, with a split annular ring being axially inserted between the frustoconical wall and the disk.

8. The rotary assembly according to claim 5, wherein each flange section comprises:
an inner portion radially supported toward the outside by the annular seal; and
said outer portion.

9. The rotary assembly according to claim 1, wherein the blade is made of a ceramic matrix composite material and the disk is made of a metal alloy.

10. A turbine for a turbomachine comprising the rotary assembly according to claim 1.

11. A turbomachine comprising the rotary assembly according to claim 1.

12. The rotary assembly according to claim 1, wherein the cylindrical surface which radially faces the inside of the disk and whereon an annular seal is held to rest has no groove wherein the annular seal could be mounted.

13. The rotary assembly according to claim 1, wherein each cavity has a bottom and each cavity bottom is closed and does not communicate with a cavity wherein an adjacent root of the blade is accommodated.

14. The rotary assembly according to claim 1, wherein the shoulders are radially formed at the same level as interfaces located between side flanks of the teeth of the disk and side flanks of the roots of the blades, when the roots of the blades are pressed toward the outside against the teeth, because of a centrifuge effect.

15. The rotary assembly according to claim 1, wherein each flange section comprises:
an inner portion radially supported toward the outside by the annular seal; and
said outer portion.

* * * * *